(12) United States Patent
Katsuzawa et al.

(10) Patent No.: US 6,692,202 B2
(45) Date of Patent: Feb. 17, 2004

(54) SPINDLE PROTECTIVE STRUCTURE IN SPINDLE-THROUGH COOLANT FEEDER

(75) Inventors: Yukio Katsuzawa, Yamanashi (JP); Yasuyuki Nakazawa, Fujiyoshida (JP); Tomohiro Seki, Yamanashi (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 10/128,465

(22) Filed: Apr. 24, 2002

(65) Prior Publication Data

US 2002/0159852 A1 Oct. 31, 2002

(30) Foreign Application Priority Data

Apr. 25, 2001 (JP) ........................................ 2001-127966

(51) Int. Cl.[7] ................................................ B23D 7/00
(52) U.S. Cl. ...................... 409/135; 409/136; 277/549; 277/551
(58) Field of Search ................................. 409/135, 136; 277/549, 551; 408/56, 57, 59, 60

(56) References Cited

U.S. PATENT DOCUMENTS

| | | | |
|---|---|---|---|
| 4,822,059 A | | 4/1989 | Shimasaki et al. |
| 5,072,948 A | | 12/1991 | Kostrzewski |
| 5,290,135 A | * | 3/1994 | Ball et al. .................... 409/136 |
| 5,439,333 A | * | 8/1995 | Kubo ............................ 409/136 |
| 5,651,645 A | * | 7/1997 | Wawrzyniak et al. ........ 409/135 |
| 5,707,186 A | * | 1/1998 | Gobell et al. ................ 409/136 |
| 5,954,347 A | * | 9/1999 | Buck et al. ................... 409/234 |
| 5,967,716 A | * | 10/1999 | Katsuzawa et al. .......... 409/136 |
| 5,984,595 A | * | 11/1999 | Mizoguchi ................... 409/136 |
| 6,050,756 A | * | 4/2000 | Buchholz et al. ............ 409/135 |
| 6,105,595 A | * | 8/2000 | Jensen .......................... 408/138 |
| 6,436,021 B2 | * | 8/2002 | Nukui ............................. 483/1 |

FOREIGN PATENT DOCUMENTS

| | | |
|---|---|---|
| EP | 0519904 A1 | 6/1992 |
| EP | 0878896 A1 | 11/1998 |
| EP | 0924026 A2 | 6/1999 |
| JP | 61-181159 | 11/1986 |
| JP | 1-84941 | 6/1989 |
| JP | 1-132342 | 9/1989 |
| JP | 4-57354 | 5/1992 |
| JP | 5-296376 | 11/1993 |
| JP | 11-063334 | 3/1999 |

* cited by examiner

Primary Examiner—Erica Cadugan
Assistant Examiner—Dana D Ross
(74) Attorney, Agent, or Firm—Staas & Halsey LLP (57) ABSTRACT

A spindle protective structure in a spindle-through coolant feeder capable of preventing coolant form invading a spindle and a spindle motor for an excessive overflow of coolant. Coolant is supplied into a through hole formed axially in the spindle or a shaft connected to the spindle through a stationary member and a rotary member of a rotary joint supported by a housing. A seal member having elasticity is provided on a circumferential surface of the spindle or the shaft. Coolant which leaks through the seal member is splashed by a fringer provided in the housing. When a large amount of coolant is overflowed in the housing, a pressure of the coolant in a first chamber of the housing increases to press a lip of the seal member towards the circumferential surface of the spindle or the shaft to prevent leakage of coolant into a second chamber of the housing. Thus, the excessive overflow of coolant is prevented from invading the spindle and the spindle motor for a long enough time for an operator to take countermeasure for the leakage of coolant.

12 Claims, 6 Drawing Sheets

SPINDLE PROTECTIVE STRUCTURE IN SPINDLE-THROUGH COOLANT FEEDER

BACKGROUND OF THE INVENTION

1. Field of the Invention

The present invention relates to a spindle protective structure in a spindle-through coolant feeder.

2. Description of Related Art

As a spindle structure for use in a high-speed rotating machine tool such as a drilling machine and a tapping machine or a machining center, there is known a spindle-through coolant feeder for feeding machining fluid to a tip of a tool attached to a spindle through a hole formed axially in the spindle for cooling cutting edges of the tool and removing chips.

Such spindle-through coolant feeders are known as a spindle structure in which a spindle is driven by a spindle motor through a transmission device such as a gear train or a belt and coolant is supplied from the through hole of the spindle, a spindle structure in which the spindle is directly coupled with a rotor shaft of the spindle motor and coolant is supplied through the through hole of the spindle and a through hole formed axially in the rotor shaft, and a spindle structure in which the spindle and the spindle motor are combined to form a built-in motor.

In recent spindle-through coolant feeders, coolant of high pressure is generally used for increasing the efficiency of discharging chips and cooling cutting edges of the tool to improve a finished state of a workpiece. Therefore, if an excessive overflow of coolant is caused at a rotary joint, there is a risk that a large amount of coolant may leak outside in a moment. In the case of the above first mentioned spindle structure, coolant may reach peripheries of the spindle, and in the case of the secondly and thirdly mentioned spindle structures, coolant may directly invade the spindle motor or the built-in motor, to possibly cause serious problems such as rust, abnormal rotation or electrical failure. Further, if coolant is not properly supplied to the tip of the tool, cutting edges of the tool or a workpiece may be damaged.

Thus, it is necessary to prevent the coolant from invading the spindle and the spindle motor. However, if a general oil seal which is an effective measure for preventing fluid leakage is used, a temperature of a lip of the oil seal increases because of heat generated by friction between a surface of the shaft rotating at high-speed and the lip to exceed an allowable temperature range of the general oil seal. Thus, the general oil seal is not used for the above-mentioned spindle structure and only a seal member of non-contact type such as a fringer or labyrinth type has been adopted.

Figure 6:
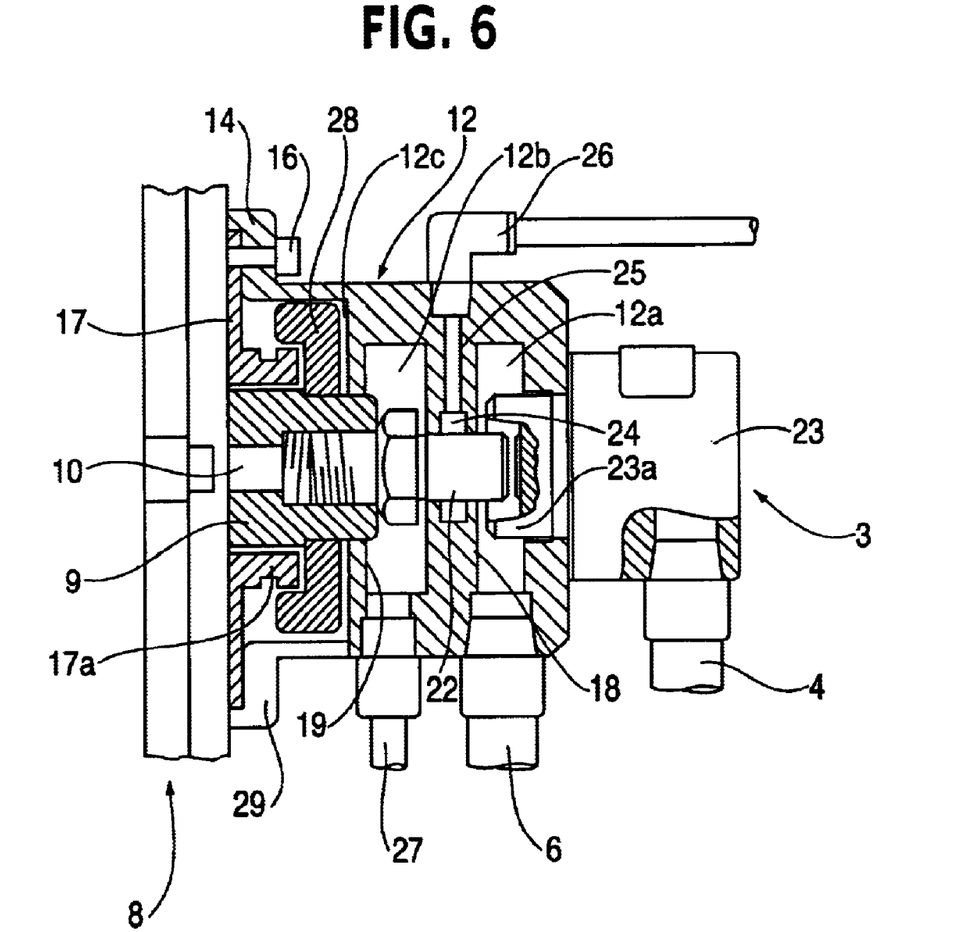
FIG. 6 is a cross-sectional view of a conventional spindle protective structure for a spindle-through coolant feeder.

FIG. 6 is a cross-sectional view of a seal stricture in a spindle structure for a machine tool or a machining center with a spindle extending in the horizontal direction, as proposed in U.S. Pat. No. 5,967,716.

A rotary joint support housing 12 is fixed to an end face of a spindle motor 8 by bolts 16 led though holes formed at a flange 14. The spindle motor 8 and the rotary joint support housing 12 are aligned by engagement of an inner circumferential face of the flange 14 and an outer circumferential face of a spigot 17 provided on the end face of the induction motor 8.

The interior of the rotary joint support housing 12 is divided into three chambers 12a, 12b and 12c by partition walls 18 and 19 in an axial direction of a rotor shaft 9. A drain pipe 6 and an auxiliary drain pipe 27 are connected to the housing 12 at the lower portion thereof, to communicate with the chamber 12a and the chamber 12b, respectively. A fringer 28 is fixed to the rotor shaft 9 in the chamber 12c to rotate with the rotator shaft 9 to splash dust and fluid radially outward by centrifugal force of the rotation.

A rotary joint 3 is composed of a nipple-like rotary member 22 which is fixed on a distal end of the rotor shaft 9 and rotates with the rotary shaft 9, and a stationary member 23 fixed to the housing 12. A through hole 10 formed axially in the rotor shaft 9 has a tapered pipe thread at its end, and the rotary member 22 is screwed into the through hole 10 to be finely fixed to the rotor shaft 9. The stationary member 23 is fixed to the housing 12 such that a socket portion 23a thereof projects into the chamber 12a to be positioned in confronting relation to the rotary member 22. A pipe 4 for supplying coolant is connected to the stationary member 23.

Coolant supplied from a pipe 4 is lead through an inner conduit in the stationary member 23 to the socket portion 23a and transits from the socket portion 23a to a through hole in the rotary member 22 to be introduced into the through hole 10 of the rotor shaft 9. Coolant leaked out in the transition from the socket portion 23a to the rotary side member 22 is discharged by the drain pipe 6 from the chamber 12a.

A circular groove 24 is formed on an inner surface of the through hole of the partition wall 18 in sliding contact with the circumferential surface of the rotary member 22. Compressed air or the like is supplied to the chamber 12a from an air purge pipe 26 through a thin hole 25 formed in the partition wall 18 in the radial direction and the circular groove 24, to raise the pressure in the chamber 12a so that the coolant overflowed in the chamber 12a is reliably discharged through the drain pipe 6 to the outside.

Further, coolant in the chamber 12b is discharged through the auxiliary drain pipe 27, and coolant in the chamber 12c is splashed radially outward by the fringer 28 and discharged from cutouts 29 formed at a lower circumference of the housing 12. Further, a flow rate sensor is provided in a flow passage of the drain pipe 6 so that an alarm is issued when a flow rate of coolant flowing in the pipe 6 exceeds a set value.

As described, for preventing the coolant overflowed from the rotary joint from invading the spindle and the spindle motor, the non-contact type seal structure such as the fringer type or a labyrinth-type is adopted. As described, this is because a general oil seal is not adoptable for such a seal structure because of the high-speed rotation of the spindle.

However, if an excessive overflow is caused in the transition from the stationary member 23 to the rotary member 22 of the rotary joint 3, there is a risk that discharge by the non-contact seal structure using the fringer 28 may not be enough to prevent the leaked coolant from invading the spindle and the spindle motor.

SUMMARY OF THE INVENTION

An object of the present invention is to provide a spindle protective structure capable of protecting a spindle and a spindle motor from being invaded by leaked coolant in a case where a large amount of coolant overflowed.

A spindle protective structure in a spindle-through coolant feeder of the present invention comprises: a jointing device for feeding coolant into a through hole formed axially in a spindle or a shaft connected to the spindle; a housing for supporting the jointing device; a drain pipe for discharging coolant overflowed in the housing from the jointing device;

and a seal member having elasticity for sealing a circumferential surface of a portion of the spindle or the shaft projected into the housing.

The above spindle protective structure is applicable to a spindle structure in which the spindle and a rotor shaft of the spindle motor are connected, to a spindle structure in which the spindle is directly coupled with a rotor shaft of the spindle motor and coolant is fed through the through hole formed axially in the spindle and the through hole formed axially in the shaft, and further to a spindle structure in which the spindle and the spindle motor are combined together to form a built-in motor.

The housing has one or more chambers and the drain pipe and/or the seal member are provided for at least one of the chambers.

The interior of the housing may be divided into a plurality chambers by at lest one partition wall and the seal member may be arranged on the partition wall between the chambers.

A non-contacting seal device such as a fringer or labyrinth may be provided in the housing in addition to the seal member.

The sealing of the circumference of the spindle or the shaft by the seal member is enhanced by pressure of the coolant overflowed in the housing. The seal member may have an elastic lip to be pressed towards the circumferential surface of the spindle or the shaft by the pressure of the coolant overflowed in the housing.

The seal member may have a slight or substantially no interference in fitting the spindle of the shaft to reduce heat generated by friction in contact with the circumferential surface of the spindle or the shaft.

DETAILED DESCRIPTION OF THE PREFERRED EMBODIMENTS

Figure 3:
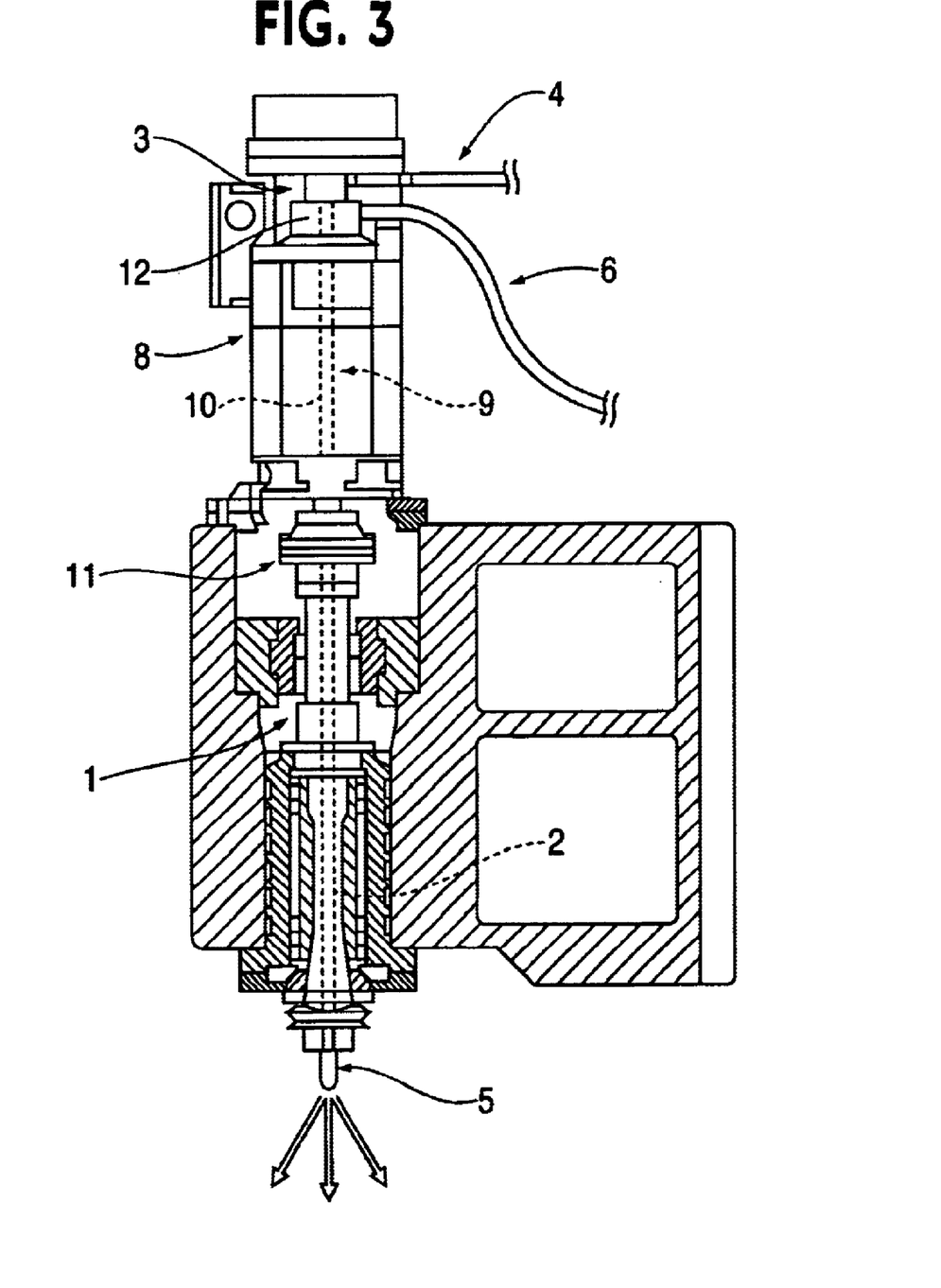
FIG. 3 is a cross-sectional view of a spindle structure in which a spindle and a rotor shaft of a spindle motor are directly coupled.
Figure 4:
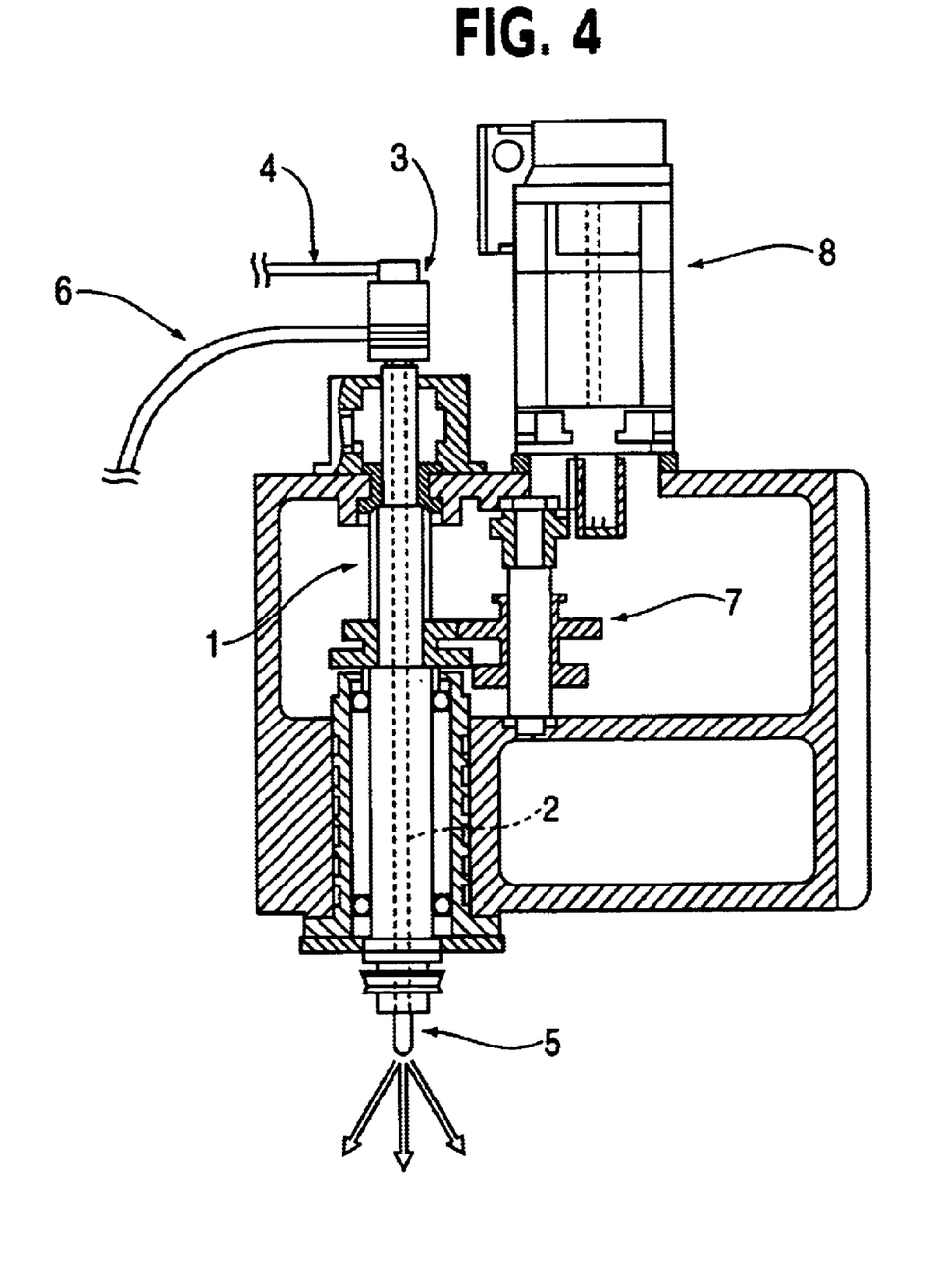
FIG. 4 is a cross-sectional view of a spindle structure in which a spindle is connected to a spindle motor through a transmission device.
Figure 5:
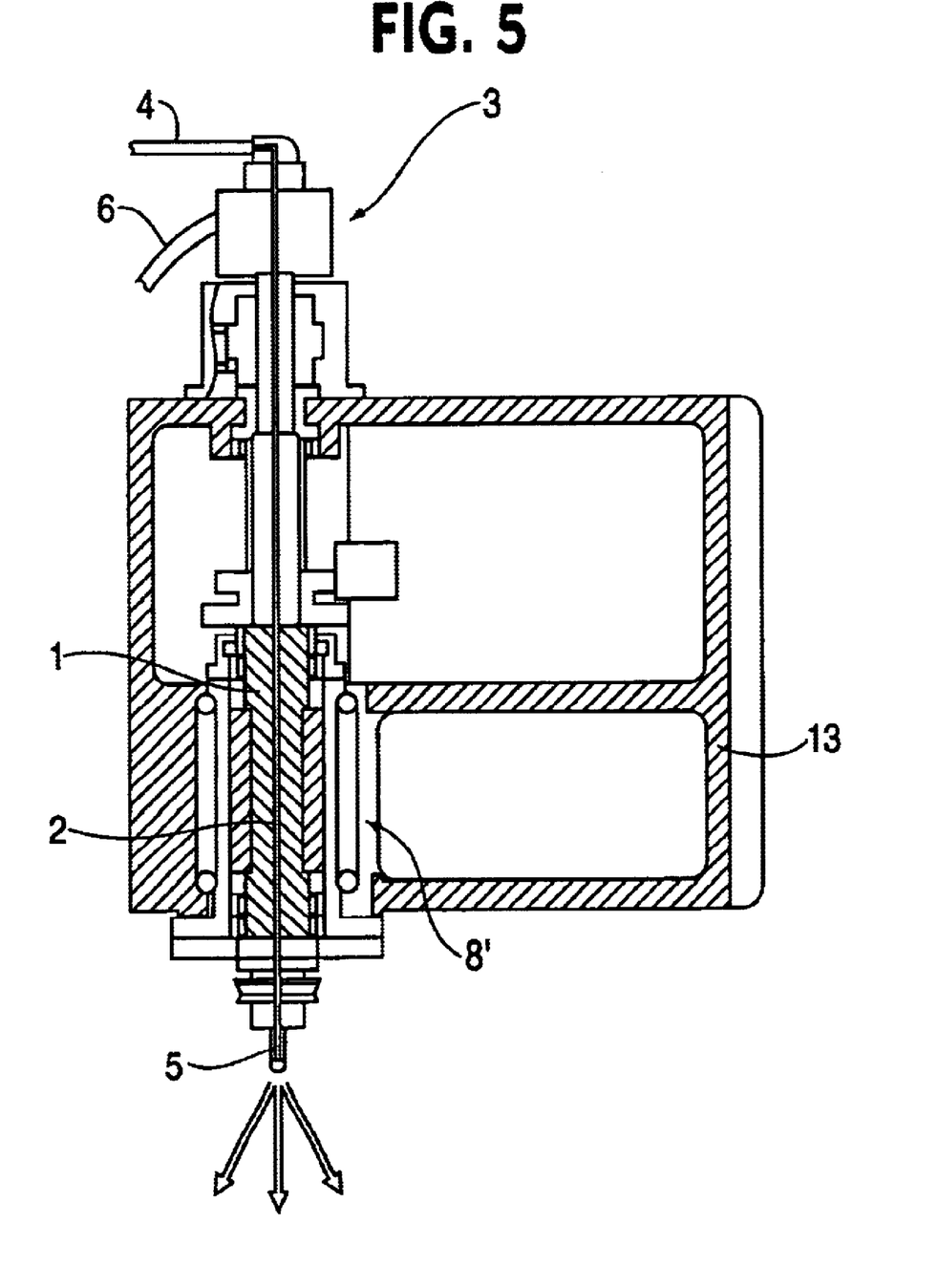
FIG. 5 is a cross-sectional view of a spindle structure in which a spindle and a spindle motor are combined to form a built in motor.

FIGS. 3, 4 and 5 show spindle structures to which the spindle protective structure of the present invention is applied.

In the spindle structure of FIG. 4, an axial through hole 2 is bored through a spindle 1 and an end of the through hole 2 is connected to a pipe 4 through a rotary joint 3 so that coolant from the pipe 4 is led through the rotary joint 3 and the though hole 2 to a tip of a tool 5. A drain pipe 6 is provided at the rotary joint 3 in order to discharge coolant overflowing in the rotary joint 3 to the outside.

The above structure is not actually suitable for the high-speed rotation of the spindle 1 because of power loss and oscillation of the spindle 1, since the spindle 1 is driven by a spindle motor 8 through a gear train 7, a belt or the like.

A spindle structure to improve performance of the above structure is shown in FIG. 3. In this structure, in addition to a though hole 2 bored through a spindle 1, an axial through hole 10 is bored through a rotor shaft 9 of a spindle motor 8. The spindle 1 and the rotor shaft 9 are coupled by a coupler 11, and coolant from a pipe 4 is led through a rotary joint, 3 which is mounted on a rotary joint support housing 12 provided at an end of the spindle motor 8, and then through the through hole 10 and the through hole 2 to a tip of a tool 5. Since the spindle 1 is driven by the spindle motor 8 directly, the structure is free from problems such as power loss and oscillation of the spindle 1, and suitable for the high-speed rotation of the spindle 1. A drain pipe 6 is provided at the rotary joint support housing 12 in order to discharge coolant overflowing in the rotary joint 3 to the outside.

Further, a spindle structure in which a spindle is incorporated into a spindle motor to form a built-in motor is shown in FIG. 5. A rotor shaft of a built-in motor 8' comprises a spindle 1 and a stator of the built-in motor 8' is arranged at a housing 13 of the spindle structure. A through hole 2 is formed in the rotor shaft of the spindle 1 in the axial direction and a pipe 4 is connected to an end of the spindle 1 through a rotary joint 3 to provide coolant from the pipe 4 to a tip of a tool 5. A drain pipe 6 is provided at the rotary joint support housing 12 in order to discharge coolant overflowing in the rotary joint 3 to the outside.

The spindle protective structure of the present invention is applicable to the spindle structure in which a spindle 1 is directly coupled with a rotor shaft 9 of a spindle motor 8 and coolant is supplied through a through hole 2 of the spindle 1 and a through hole 10 of the rotor shaft 9 to spout from a tip of the tool, as shown in FIG. 3, to a spindle structure in which a spindle 1 is driven through a gear train 7 or a belt by the spindle motor 8 and the coolant is supplied from the through hole 2 of the spindle 1, as shown in FIG. 4, and a spindle structure in which a spindle motor is built in the spindle, as shown in FIG. 5.

Figure 1:
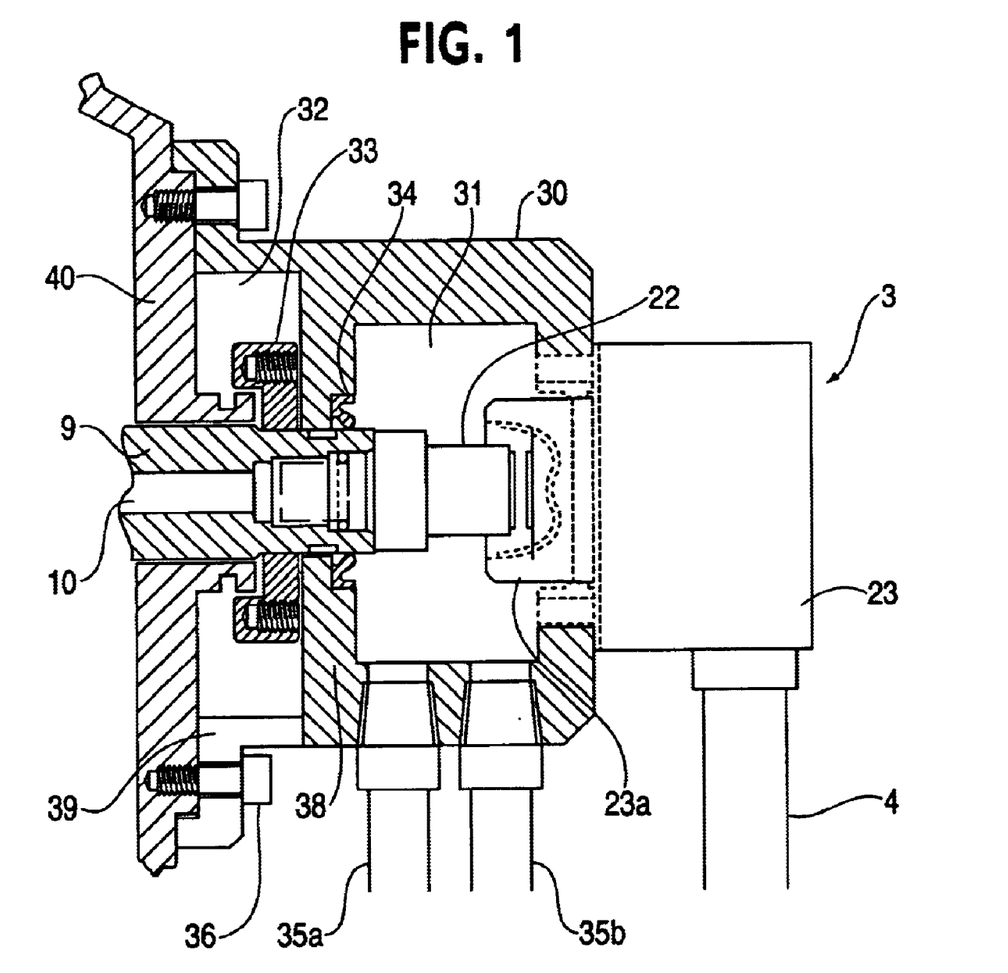
FIG. 1 is a cross-sectional view of a spindle protective structure according to an embodiment of the present invention.

FIG. 1 shows an example of a spindle protective structure in a spindle-through coolant feeder applied to the spindle structure shown in FIG. 3.

A rotary joint support housing 30 is fixed to an end face of a housing 40 of a spindle motor 8 (or a housing of the spindle structure shown in FIGS. 4 and 5) by bolts 36.

A rotary joint 3 is composed of a nipple-like rotary member 22 which is fixed on a distal end of a rotor shaft 9 to rotate with the rotary shaft 9, and a stationary member 23 fixed to the housing 30. The rotary member 22 is fixed on a distal end of a spindle 1 to rotate with the spindle 1 in the cases of the spindle structures shown in FIGS. 4 and 5. A through hole 10 formed axially in the rotor shaft 9 has a tapered pipe thread at its end, and the rotary member 22 is screwed into the through hole 10 to be firmly fixed to the rotor shaft 9.

The stationary member 23 is fixed to the housing 30 such that a socket portion 23a thereof projects in the housing 30 to positioned in confronting relation to the rotary member 22.

The interior of the rotary joint support housing 30 is divided into a first chamber 31 and a second chamber 32 by a partition wall 38 in an axial direction of the rotor shaft 9. Drain pipes and 35b are connected with the first chamber 31, and a fringer 33 is fixed to the rotor shaft 9 in the second chamber 32 to rotate with the rotor shaft 9 to splash dust and fluid radially outward by centrifugal force of the rotation. Further, a cutout 39 is formed at the lower portion of the second chamber 32 of the housing 30 to discharge the dust and fluid splashed by the fringer 33.

The partition wall 38 has a through hole through which the rotor shaft 9 is laid and a seal member 34 is provided at the through hole. An dust oil seal having characteristics of high elasticity and low temperature rise is used as the seal member 34.

Coolant supplied from a pipe 4 is lead through an inner conduit in the stationary member 23 to the socket portion 23a and transits from the socket portion 23a to a through hole in the rotary member 22 to be introduced into the through hole 10 of the rotor shaft 9. Coolant leaked out in the transition from the socket portion 23a to the rotary side member 22 is discharged by the drain pipes 35a and 35b from the first chamber 31.

Further, the coolant leaked from the first chamber 31 to the second chamber 32 through the seal member 34 is splashed radially outwardly by the fringer 33 and discharged from the cutout 39.

Figure 2A:
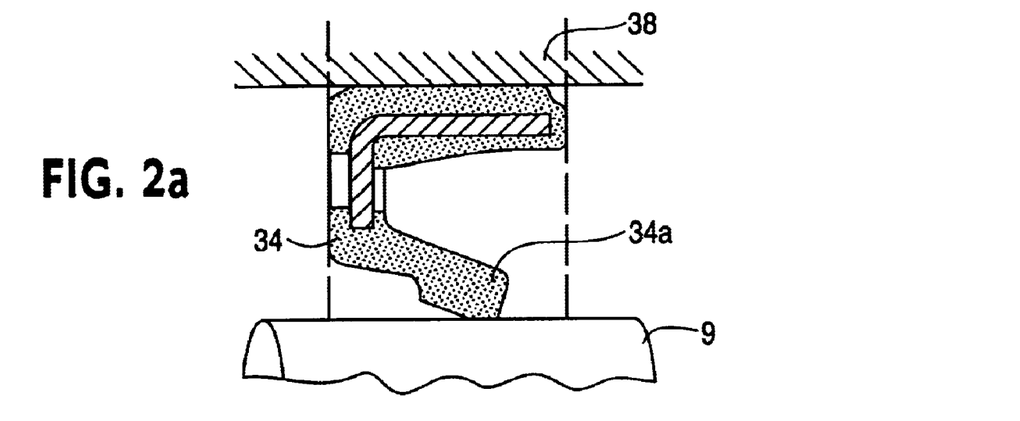
FIGS. 2a–2c are enlarged cross-sectional views showing functions of a seal member provided in the spindle protective structure shown in FIG. 1.
Figure 2B:
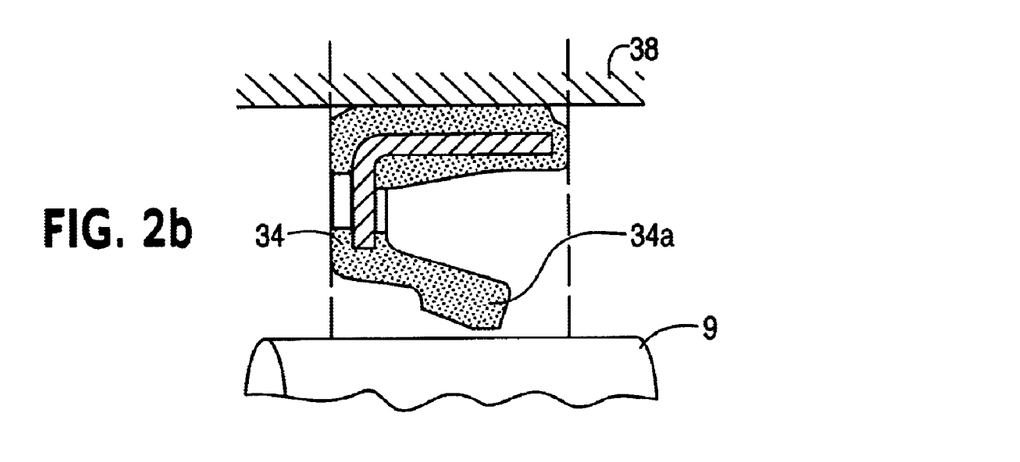
Figure 2C:
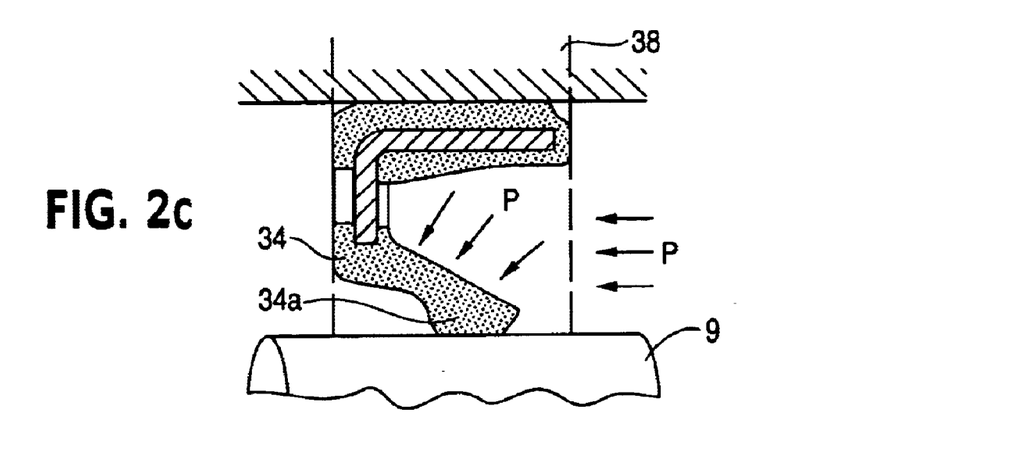

The function of the seal member 34 for sealing the circumferential surface of the rotor shaft 9 in the above seal structure will be further described in detail referring to FIGS. 2a–2c.

FIG. 2a shows a state immediately after a new seal member 34 is fitted between the circumferential surface of the rotor shaft 9 and the partition wall 38. The seal member 34 has substantially no interference or a slight interference for fitting the rotor shaft 9 so that a distal end of a lip 34a is just in contact with or slightly interfered with the circumferential surface of the rotor shaft 9.

After a considerable time use, the lip 34a is abraded by friction of contact with the circumferential surface of the rotator shaft 9 rotating at a high speed, and a small gap may be formed between a distal end of the lip 34a and the circumferential surface of the rotor shaft 9, as shown in FIG. 2b. If the coolant enters the second chamber 32 through the small gap, the entered coolant is splashed by the fringer 33 and discharged from the second chamber 32 through the cutout 39.

However, if a large amount of coolant overflows in the first chamber 31 because of some reason such as a malfunction of the coolant supplying section including the rotary joint 3, the discharge through the drain pipe 35a and 35b may not be enough to deal with the overflowed coolant to allow the large amount of coolant to leak into the second chamber 32 through the gap between the lip 34a and the circumferential surface of the rotor shaft 9. If the amount of leaked coolant is so large to not be completely splashed by the fringer 33, there is a risk that the leaked coolant invades the spindle and/or the spindle motor.

According to the present invention, if the overflow of a large amount of coolant is caused in the first chamber 31, a pressure P in the first chamber 31 increases to make the seal member 34 expand to press the lip 34a against the circumferential surface of the rotor shaft 9. Thus, the leakage of the coolant through the gap between the lip 34a and the circumferential surface of the rotor shaft 9 is greatly reduced or eliminated to prevent invading of coolant into the housing 40 of the spindle structure in combination with the discharge of the leaked coolant by the fringer 33.

Further, when an excessive overflow of coolant is caused and it is detected that the flow rate of coolant in the drain pipe 6 exceeds a set value by a flow rate sensor provided in the flow passage of the drain pip 35a, 35b, an alarm is issued so that an operator may take countermeasures against the coolant leakage. The seal member 34 prevents the leaked coolant from invading the spindle and the spindle motor for a considerable time enough for an operator to deal with the excessive overflow of coolant by stopping the machining and the supply of coolant.

In the above embodiment, an interior of the rotary joint supporting housing 12 is divided into two chambers, the interior of the rotary joint supporting housing 12 may be divided into three or more chambers. In this case, the drain pipe and/or the seal member may be provided for at least one of the chambers.

Further, a non-contact seal structure of a fringer type is adopted in the above embodiment, a labyrinth-type may be substituted for the fringer.

According to the present invention, when a larger amount of coolant overflows from a rotary joint for feeding coolant into a through hole formed in a spindle or a rotor shaft of a spindle motor connected to the spindle, the excessive overflow of the coolant is prevented from invading the spindle and the spindle motor, to thereby protect the spindle and the spindle motor.

What is claimed is:

1. A spindle protective structure in a spindle-through coolant feeder for feeding coolant to a distal end of a spindle driven by a spindle motor, comprising:

a jointing device for feeding coolant into a through hole formed axially in the spindle or through holes formed axially in the spindle and a shaft connected to the spindle;

a housing for supporting said jointing device;

a drain pipe for discharging coolant overflowed in said housing from said jointing device; and a seal member having an elastic lip arranged around a circumferential surface of a portion of the spindle or the shaft projected in said housing with a small gap therebetween to be elastically deformed and pressed against the circumferential surface by pressure of coolant excessively overflowed in said housing, to thereby seal the circumferential surface and prevent an excessive leakage of coolant through the gap.

2. A spindle protective structure according to claim 1, wherein the spindle and a rotor shaft of the spindle motor are connected by a coupler.

3. A spindle protective structure according to claim 1, wherein the spindle is directly coupled with a rotor shaft of the spindle motor, and coolant is fed through the through hole formed axially in the spindle and the through hole formed axially in the rotor shaft.

4. A spindle protective structure according to claim 1, wherein the spindle and the spindle motor are combined together to form a built-in motor.

5. A spindle protective structure according to claim 1, wherein interior of said housing has one or more chambers and said drain pipe and/or said seal member are provided for at least one of the chambers.

6. A spindle protective structure according to claim 1, wherein interior of said housing is divided into a plurality chambers by at least one partition wall and said seal member is arranged on the partition wall between the chambers.

7. A spindle protective structure according to claim 1, further comprising a non-contacting seal device provided in said housing.

8. A spindle protective structure according to claim 1, wherein the sealing of the circumference of the spindle or the shaft by said seal member is enhanced by pressure of the coolant overflowed in said housing.

9. A spindle protective structure according to claim 1, wherein said seal member has a slight or substantially no interference for fitting to reduce heat generated by friction in contact with the circumferential surface of the spindle or the shaft.

10. A spindle protective structure according to claim 1, wherein the seal member directly contacts the shaft.

11. A spindle protective structure according to claim 1, wherein the coolant presses the seal member towards the shaft.

12. A spindle protective structure according to claim 1, wherein the coolant presses the seal member in a direction perpendicular to an axial direction of the shaft.

* * * * *

UNITED STATES PATENT AND TRADEMARK OFFICE
CERTIFICATE OF CORRECTION

PATENT NO. : 6,692,202 B2
DATED : February 17, 2004
INVENTOR(S) : Yukio Katsuzawa et al.

It is certified that error appears in the above-identified patent and that said Letters Patent is hereby corrected as shown below:

Title page,
Item [57], ABSTRACT,
Line 2, change "form" to -- from --.

Column 1,
Line 54, change "stricture" to -- structure --;
Line 59, change "though" to -- through --.

Column 2,
Line 13, change "finely" to -- firmly --.

Column 3,
Line 17, before "chambers" insert -- of --;
Line 17, change "lest" to -- least --;
Line 49, change "built in" to -- built-in --;
Line 63, change "though" to -- through --.

Column 4,
Line 5, change "though" insert -- through --;
Line 9, change "joint, 3" to -- joint 3 --;
Line 50, change "rotary" to -- rotor --;
Line 60, delete "to" (first occurrence);
Line 65, after "pipes" insert -- 35a --.

Column 5,
Line 7, change "An" to -- A --;
Line 34, change "rotator" to -- rotor --;
Line 44, change "pipe" to -- pipes --;
Line 64, change "pip" to -- pipes --.

UNITED STATES PATENT AND TRADEMARK OFFICE
CERTIFICATE OF CORRECTION

PATENT NO. : 6,692,202 B2
DATED : February 17, 2004
INVENTOR(S) : Yukio Katsuzawa et al.

It is certified that error appears in the above-identified patent and that said Letters Patent is hereby corrected as shown below:

Column 6,
Lines 33-34, change "ther-ebetween" to -- there-between --;
Line 54, after "plurality" insert -- of --.

Signed and Sealed this

Twenty-second Day of June, 2004

JON W. DUDAS
*Acting Director of the United States Patent and Trademark Office*